United States Patent
Reese et al.

(10) Patent No.: US 9,592,660 B2
(45) Date of Patent: Mar. 14, 2017

(54) HEATED BUILD PLATFORM AND SYSTEM FOR THREE DIMENSIONAL PRINTING METHODS

(71) Applicant: Arevo Inc., Saratoga, CA (US)

(72) Inventors: Riley Reese, Carpinteria, CA (US); Hemant Bheda, Saratoga, CA (US)

(73) Assignee: AREVO INC., Santa Clara, CA (US)

( * ) Notice: Subject to any disclaimer, the term of this patent is extended or adjusted under 35 U.S.C. 154(b) by 22 days.

(21) Appl. No.: 14/574,237

(22) Filed: Dec. 17, 2014

(65) Prior Publication Data

US 2016/0176118 A1 Jun. 23, 2016

(51) Int. Cl.
| | |
|---|---|
| *B29C 67/00* | (2006.01) |
| *B33Y 30/00* | (2015.01) |
| *B33Y 50/02* | (2015.01) |
| *B29L 9/00* | (2006.01) |

(52) U.S. Cl.
CPC .......... *B33Y 30/00* (2014.12); *B29C 67/0085* (2013.01); *B29C 67/0088* (2013.01); *B33Y 50/02* (2014.12); *B29K 2879/085* (2013.01); *B29L 2009/005* (2013.01)

(58) Field of Classification Search
CPC ................ B29C 67/0092; B33Y 30/00; B29K 2879/085; B29L 2009/005
See application file for complete search history.

(56) References Cited

U.S. PATENT DOCUMENTS

| | | | |
|---|---|---|---|
| 6,722,872 B1 | 4/2004 | Swanson et al. | |
| 7,127,309 B2 | 10/2006 | Dunn et al. | |
| 7,261,542 B2 | 8/2007 | Hickerson et al. | |
| 8,119,053 B1* | 2/2012 | Bedal | B29C 67/0077 |
| | | | 264/308 |
| 8,282,380 B2 | 10/2012 | Pax et al. | |
| 8,827,684 B1 | 9/2014 | Schumacher et al. | |
| 2001/0038168 A1 | 11/2001 | Popa et al. | |
| 2005/0058837 A1* | 3/2005 | Farnworth | B29C 67/0066 |
| | | | 428/421 |
| 2005/0275129 A1* | 12/2005 | Sambu | A61C 13/0013 |
| | | | 264/113 |

(Continued)

*Primary Examiner* — Alison L Hindenlang
*Assistant Examiner* — Jerzi H Moreno Hernandez
(74) *Attorney, Agent, or Firm* — Wilson Sonsini Goodrich & Rosati

(57) ABSTRACT

An apparatus performing as a base for printing 3D objects using high temperature thermoplastics employing additive manufacturing methods is provided. The apparatus comprises a heated build platform, a thin removable plate secured on top of the build platform, a high temperature polymer coating applied over the removable plate, and surface treatment of high temperature polymer coating to maintain adhesion between 3D object and printing surface. Also, the removable plate has low coefficient of thermal expansion compared to build platform below it, for avoiding bowing of the plate as it is heated due to heated build platform, hence providing flat printing surface. The thin removable plate allows 3D objects to pop off the plate upon cooling, without damaging the polymer coating, the plate, or the object. It also allows for continuous operation of printing, while the plate is released for cooling, a new plate is installed for printing.

15 Claims, 2 Drawing Sheets

(56) References Cited

U.S. PATENT DOCUMENTS

| | | | | |
|---|---|---|---|---|
| 2006/0198918 A1* | 9/2006 | Koyagi | ............... | B29C 67/0066 425/174.4 |
| 2007/0037509 A1* | 2/2007 | Renz | ............... | B22F 3/003 454/354 |
| 2010/0012630 A1* | 1/2010 | Leuterer | ............... | B22F 3/003 219/121.65 |
| 2010/0174392 A1* | 7/2010 | Fink | ............... | B29C 67/0077 700/104 |
| 2010/0193998 A1* | 8/2010 | Crump | ............... | B29C 67/0092 264/401 |
| 2010/0316877 A1* | 12/2010 | Song | ............... | C08G 73/10 428/458 |
| 2011/0241947 A1* | 10/2011 | Scott | ............... | B22F 3/1055 343/700 MS |
| 2012/0133083 A1* | 5/2012 | Zenere | ............... | B29C 67/0066 264/401 |
| 2012/0231225 A1* | 9/2012 | Mikulak | ............... | B29C 47/025 428/172 |
| 2012/0328726 A1* | 12/2012 | Zenere | ............... | B29C 67/0085 425/174.4 |
| 2013/0098068 A1* | 4/2013 | Takahashi | ............... | F25B 21/02 62/3.2 |
| 2013/0186558 A1* | 7/2013 | Comb | ............... | B29C 67/0051 156/277 |
| 2013/0256953 A1* | 10/2013 | Teulet | ............... | B22F 3/1055 264/497 |
| 2013/0287934 A1* | 10/2013 | Ramsundar | ............... | B05D 1/38 427/9 |
| 2013/0297320 A1* | 11/2013 | Buser | ............... | B29C 67/0055 704/275 |
| 2015/0037527 A1* | 2/2015 | Jacobs | ............... | B29D 7/01 428/41.7 |
| 2015/0145174 A1* | 5/2015 | Comb | ............... | B29C 67/0092 264/464 |
| 2015/0165687 A1* | 6/2015 | Ho | ............... | B29C 67/0088 425/144 |
| 2016/0096326 A1* | 4/2016 | Naware | ............... | B29C 67/0088 425/143 |

* cited by examiner

HEATED BUILD PLATFORM AND SYSTEM FOR THREE DIMENSIONAL PRINTING METHODS

FIELD OF THE INVENTION

The present invention generally relates to the field of 3D printing of objects, and more particularly relates to developing a heated build platform for supporting the three dimensional objects using high temperature polymers.

BACKGROUND

Additive and subtractive manufacturing technologies enable computer designs, such as CAD files, to be made into three dimensional (3D) objects. 3D printing, also known as additive manufacturing, typically comprises depositing, curing, fusing, or otherwise forming a material into sequential cross-sectional layers of the 3D object. One type of additive manufacturing commonly referred to as fused filament fabrication involves a number of printed layers of a building material, which are extruded from an extruding head of a 3D printer and deposited over a build plate over which the 3D object is formed. The build plate serves as a platform on which a 3D printed object is constructed. Also, the temperature of the build plate must be controlled and varied depending on deposited layers, the building material and other parameters of printing process. The heating of the build plate helps in maintaining the temperature of the first layer and hence fusion of the subsequent layers over the first layer.

The current 3D printing methods involve heated build plate using silicone pads and have PID control of heated plate. Also, the present methods use polyimide tape as a substrate on the build plate for 3D part adherence. Use of polyimide tape or ultem plates does not meet the thermal requirements for high temperature thermoplastics (e.g. Polyether ether ketone (PEEK), Polyetherimide (PEI), Polyphenylsulfone (PPSU), Polyamide-imide (PAI), self-reinforced polyphenylene (SRP), etc. which require the plate to be in the range of 150-300° C.). When using high temperature thermoplastics during fused filament fabrication, a heated build plate and a tacky surface are necessary to maintain adhesion between the plate and bottom layer of the printing part. If the build plate is not heated, the initial layer will not adhere to the build plate or the part will pull off the plate as the polymer contracts and cools down. If the build plate does not have a tacky surface then the polymer will slide along the plate or stick to extruding nozzle.

Polyimide tape has been applied to heated build plates for its tactility and performance under high temperatures. Applying polyimide tape is a difficult process inevitably allowing for tiny debris or air to be trapped between the tape and metal surface. Once the metal surface is heated, the air gaps expand creating an uneven printing surface. Further, the adhesive for the polyimide tape can burn off under high temperatures releasing fumes and damaging the coating.

Even if a part is built on an area of polyimide tape without debris or air bubbles, the tape can be easily damaged upon removal of the part. At elevated temperatures, the bottom layer of tape can permanently adhere to the 3D part causing the tape to tear or bubbles to form between the tape and build plate. Even when the part has been fully cooled, the polyimide tape can still adhere to the bottom layer resulting in damage or tearing of the tape upon part removal.

Another problem with the current structures of the build platform is that a user has to wait for the build platform to cool to reduce the risk of damage to the part during removal and even when plate is cooled, the part may be difficult to remove without damaging the part and/or the polyimide tape Therefore, there exists a need in the three dimensional printing methods for developing a heated build platform for supporting 3D objects of high temperature thermoplastics. Further, there also exists a need for facilitating modular and easy removal of built parts from the build surface or platform.

SUMMARY OF THE INVENTION

An objective of the present invention is to design and develop a temperature controlled build platform for three dimensional printing methods for high temperature thermoplastics.

Another objective of the present invention is to provide a removable plate that is thermally conductive and is safely secured over the build platform allowing quick installation and release of the plate, and also allowing cooling of a 3D object separately while simultaneously allowing printing of a subsequent object.

Another objective of the present invention is to apply a high temperature polymer coating on the surface of the removable plate, secured over the heated build, providing tactility for improving adhesion between printable layers and the printing surface and maintain adhesion throughout the build.

A further objective of the present invention is to provide easy dissociation of the 3D object from the build platform without damaging the 3D object and/or tacky surface provided by the coating.

A further objective of the present invention is to provide an even surface of build platform by avoiding trapping of debris or air bubbles between the tacky coating or surface and the build platform.

Another objective of the present invention is to reduce warping/bowing of the removable plate, where the thermal expansion of the plate can cause bowing and/or rippling, creating an uneven printing surface.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in detail so as to not unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

To address major issues in current build platforms or plates employed in three dimensional printing methods, one of them may be poor adhesion between the 3D object and the build platform, embodiments of the present invention provides a system and an apparatus (100) performing as a base for depositing extruded layers of polymeric material from a printhead of a 3D printer, and in result a supporting structure for a 3D object. The polymeric materials are high temperature thermoplastics, such as and not limited to PEEK, PEI, PPSU, PAI, SRP and the like. The high temperature thermoplastics demand high thermal requirements for the build platforms in order to withstand the high temperatures and heat involved during the printing process.

Figure 1:
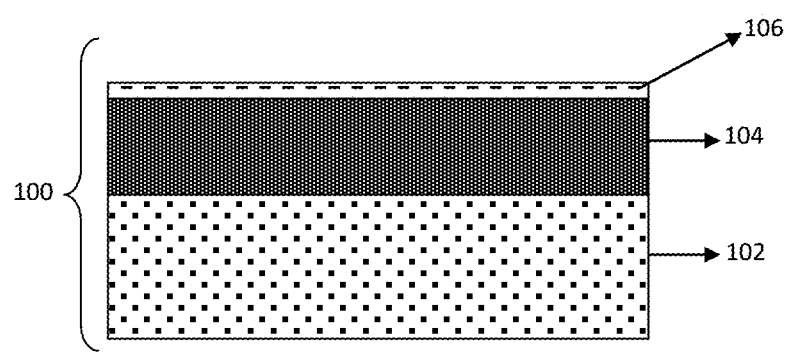
FIG. 1 shows a build platform with a removable thermally conductive and coated plate for three dimensional printing methods, in accordance with an embodiment of the present invention.

FIG. 1 shows a build platform with a removable thermally conductive and coated plate for three dimensional printing methods, in accordance with an embodiment of the present invention. As shown in FIG. 1, the build apparatus (100) comprises a build platform (102), a thermally conductive removable plate (104) and a high temperature polymer coating (106). The build platform (102) has a temperature control means that controls the temperature of the build platform (102). The surface of the build platform (102) is evenly heated using the temperature control means. In an embodiment, the build platform (102) may be evenly heated using heater cartridges (202) with thermal control from PID controllers connected to thermocouples (204) spaced evenly in the build platform (102), where the heater cartridges are acting as temperature control means for the build platform 102. In an embodiment, the material of build platform 102 may be aluminum, steel, brass, ceramic, glass, or alloys similar with low coefficient of thermal expansion (CTE).

Figure 2:
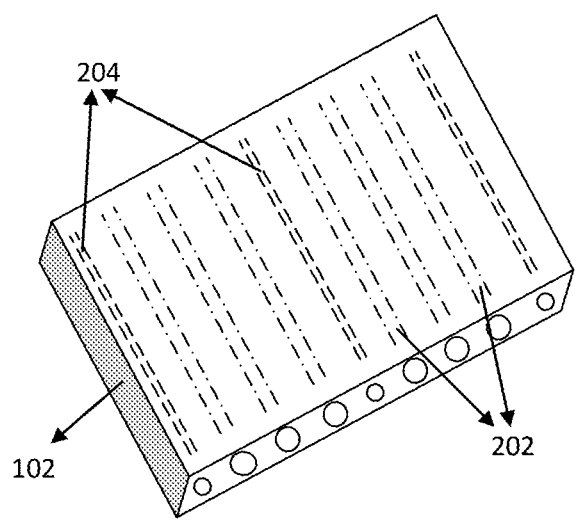
FIG. 2 shows a build platform with holes for heater cartridges and thermocouples, in accordance with an embodiment of the present invention.

FIG. 2 shows a build platform with holes for heater cartridges and thermocouples, in accordance with an embodiment of the present invention. As shown in FIG. 2 the heater cartridges are spaced evenly along the surface of the build platform 102, comprising, for example, an aluminum block. In another embodiment for controlling temperature of the build platform (102), one or more thermocouples can be situated at one or several locations (204) on the block 102 to provide feedback to a controller, such as a PID controller, and hence maintain temperature set points throughout a build. Also, a ceramic, or other high temperature dielectric, can be used to insulate the build platform 102 and protect build platform support 102 from emitted heat. The number of holes depends on the number of heating cartridges and/or thermocouples.

In and embodiment of the present invention, the build platform 102 must be able to withstand high temperatures. Since, embodiments of the present invention involve use of high temperature thermoplastics, the build platform 102 must have high thermal tolerances, and able to withstand high temperatures, such as and not limited to temperatures ranging between 150 degrees Celsius to 300 degrees Celsius.

According to FIG. 1, the build apparatus 100 further comprises a removable plate 104 secured over the build platform 102. The removable plate 104 must be thermally conductive in nature, so that it may be heated up due to the heat generated at the build platform 102 because of the temperature control means. Further, the removable plate 104 must be made of a material having a low coefficient of thermal expansion (CTE), to avoid expansion of the plate as it is heated up due to the heated build platform 102. In an embodiment, the material for the removable plate 104 may be aluminum, steel, brass, ceramic, glass, or alloys similar with low coefficient of thermal expansion (CTE). Also, the removable plate 104 must be thin, for example, the thickness of the plate 104 may range from 0.025-0.5". Further, the thickness of the plate 104 also depends on the flexural character of the material. The removable plate 104 must be thin enough to allow for minor flexing for part removal; however, it must not be too thin such that heating of the plate produces rippling, bowing, or warping of the plate, resulting in a print surface that is uneven or not consistently level. Furthermore, the removable plate 104 must be able to withstand high temperatures, such as and not limited to temperatures ranging up to 300 degrees Celsius.

According to embodiments of the present invention, the removable plate 104 is removably secured over the build platform 102. This allows for quick install and release of the plate 104 from the build platform 102. The removable plate 104 is preferably appropriately secured to prevent warping/bowing of the removable plate 104 due to the differences in thermal expansion and contraction compared to the build platform 102. It may be obvious to the person skilled in the art, that there exists a variety of methods to removably secure a plate over a build platform. In an embodiment, guiding legs/rails may be used to slide the removable plate 104 into multiple grooves and multiple set screws and fasteners to secure the plate 104 onto build platform 102. In another embodiment, spring/latch quick-release mechanism may be used to secure in place and remove the plate 104. In another embodiment, the method may be vacuum suction of the plate 104 onto build platform 102. In yet another embodiment, the method may be magnets and/or electromagnets to secure the plate 104 onto build platform 102.

As shown in FIG. 1, a high temperature polymer coating 106 is applied directly over the surface of the removable plate 104. In an embodiment, the high temperature polymer used for coating may be polyimide. In an embodiment, a high temperature polymer coating 106 is spray coated over the plate 104. It may be obvious to a person skilled in the art that there exists a variety of coating methods and types of high temperature polymer coatings that can be used to create a coated layer 106 over the plate 104. Further, the thickness of the high temperature polymer coating may range from 0.001" to 0.1". The surface of the removable plate 104 is coated with thin layer of a high temperature polymer in order to impart better adherence properties both to the bottom layer of a 3D object and the plate 104 over the current methods of using polyimide plate. The high temperature polymer coating 106 provides a tacky surface preventing the extrudate (material extruded from the nozzle) from sliding along the plate 104 or sticking to extruding nozzle. Further, the high temperature polymer coating 106 is resilient in nature and cannot be easily scratched or punctured. The surface toughness of this coating 106 prevents damage from occurring during 3D object removal.

Furthermore, the high temperature polymer coating 106 does not wear away and thus does not need to be replaced after every build under high temperature. Also, the coating 106 is applied to a clean plate 104 that further minimizes or eliminates the potential for occurrence of trapped debris or air bubbles between the coating 106 and the plate surface 104. Advantageously, the high temperature polymer coating 106 can operate at temperatures up to 300° C. suitable for any high temperature polymer.

In order to increase polymer adhesion to the plate surface 104 coated with the high temperature polymer 106, the surface of the high temperature polymer coating 106 may be roughened or treated. The surface treatment of the high temperature polymer coating 106 imparts a regular or an irregular patterned feature to the coating 106. In an embodiment, the surface of the high temperature polymer coating 106 may be roughened at the nano-, micro-, or milli-meter scale using methods like and not limited to sand blasting, bead blasting, and/or metal wire brushing to increase polymer adhesion to the coated surface 106.

The removable plate 104 also possesses flexibility owing to the type of material it is made of. The flexibility of the plate 104 allows for easier dissociation between the 3D object and the removable plate 104 upon cooling. Further, this flexibility also reduces the possibility of damage to the high temperature polymer coating 106 or the 3D object during object removal since a blade or wedge is no longer needed to pry off the object.

The advantage of having the removable plate 104 secured over the build platform 102 is easy removal of the built object upon completion. This happens, since the removable plate 104 is thin and also there is a significant difference in thermal contraction between the removable plate and the 3D printed polymer object. Therefore once the building of the object is finished, the object will pop off the plate 104 when the plate and part have cooled. This efficiently avoids the general issue in the current art, where the 3D object sticks to the heated build platform, and the object has to be dug out from the platform in order to remove it or having to remove the object from a support raft requiring an additional step to dissolve or mechanically remove the support from the part. Another efficient advantage of securing a removable thin plate 104 over the heated build platform 102 is that it allows for quick installation and release of the plate 104 from the build platform 102, further allowing for quick transfer of 3D objects during printing. This helps in continuous operation of the 3D printer, increasing the efficiency of the printer.

The low coefficient of thermal expansion (CTE) of the plate 104 favors an even flat surface for printing. This is because if the material of the plate 104 has a much higher CTE than the build platform 102 below it, then the plate 104 will bow or deform and actually separates from the build platform 102. Resultantly, the surface for printing a 3D object, which is the surface of the removable plate 104, will become uneven and hence, the printing process doesn't have a flat surface to print on. Therefore, the plate 104 should have a low CTE, so that if the build platform 102 below expands, the plate 104 does not bow or deform, and the printing surface will be flat, level, and consistent. Hence, the material of the plate 104 may be thin ceramic, which is thin enough to still conduct heat and have minimal expansion upon heating.

The build apparatus 100 described in embodiments of the present invention is suitable for additive manufacturing methods, including and not limited to fused filament fabrication (FFF) and other thermoplastic based reinforced fiber laying processes.

Advantageously, embodiments of the present invention provides an apparatus comprising a heated build platform 102 over which a removable plate 104 is removably secured, and a layer of a high temperature polymer coating 106 is applied over the surface of the plate 104. The high temperature polymer coating 106 provides adhesion between the 3D object and the surface of the plate 104. Further, embodiments of the present invention disclose surface treatment of the high temperature polymer coating 106 in order to increase polymer adhesion and the plate 106. Therefore, the use of a high temperature polymer coating 106 in an embodiment of the present invention instead of polyimide tape over a removable plate provides a consistent, smooth, tacky, long-lasting surface for the construction of 3D objects via FFF and continuous fiber deposition. Further, a method of securing the coated removable plate 104 to a fixed build platform 102 to allow for easy separation of the object from the removable plate 104 and for quick exchange of objects between builds.

Furthermore, the polyimide coating 106 has demonstrated better adherence properties both to the bottom layer of a 3D object and the plate 104 over the currently used polyimide tape. This coating 106 is much more resilient compared to polyimide tape, which can be easily scratched or punctured. The surface toughness of this coating 106 prevents damage from occurring during 3D object removal. The polyimide coating 106 does not wear away and thus does not need to be replaced. On the other hand, the current art polyimide tape is preferably replaced after every build under high temperature build platform temperatures. Also, the polyimide coating 106 is applied to a clean plate minimizing or eliminating the potential for trapped debris or air bubbles between the coating 106 and removable plate surfaces 104.

Further advantages include, the polyimide coating 106 can operate at high temperatures up to 300 degrees Celsius suitable for any high temperature thermoplastic. The flexibility of the removable plate 104 also reduces the possibility of damage to the coating 106 or the object during object removal since a blade or wedge is no longer needed to pry off the part. The surface of the polyimide coating 106 can be roughened at the nano-, micro-, or milli-meter scale using sand blasting, bead blasting, and/or metal wire brushing to increase polymer adhesion to the coated surface.

We claim:

1. A build apparatus for printing a 3D object of thermoplastics employing additive manufacturing methods, the apparatus comprising:
   a build platform with a temperature control unit configured to control heating of the build platform;
   a thermally conductive plate disposed adjacent to the build platform; and
   a polymer coating attached to a surface of the thermally conductive plate which is capable of (i) facilitating adhesion to the 3D object during printing and (ii) permitting removal of the 3D object once the 3D object has been formed and cooled without chemically or mechanically removing the polymer coating from 3D object and without damaging the polymer coating, the thermally conductive plate, or the 3D object, wherein the polymer coating is not a polymer tape.

2. The build apparatus of claim 1, wherein the polymer coating is a polyimide.

3. The build apparatus of claim 1, wherein the temperature control unit comprises heater cartridges that are spaced along a surface of the build platform.

4. The build apparatus of claim 1, wherein the build platform comprises thermocouples situated at one or several locations to provide feedback to a controller for maintaining temperature set points.

5. The build apparatus of claim 1, further comprising a ceramic or high temperature dielectric that insulates the build platform.

6. The build apparatus of claim 1, wherein the build platform, the thermally conductive plate, and the polymer coating are able to withstand high temperature ranging between 150 degree Celsius and 300 degree Celsius.

7. The build apparatus of claim 1, wherein the material for the thermally conductive plate comprises one or more of aluminum, steel, brass, ceramic, glass, or alloys with a low coefficient of thermal expansion (CTE).

8. The build apparatus of claim 1, wherein the material for the build platform comprises one or more of aluminum, steel, brass, ceramic, glass, or alloys with a low coefficient of thermal expansion (CTE).

9. The build apparatus of claim 1, wherein the thermally conductive plate thickness ranges from 0.025-0.5" and wherein the thickness is selected depending on the flexural character of the material.

10. The build apparatus of claim 1, wherein the thickness of the polymer coating ranges from 0.001" to 0.1".

11. The build apparatus of claim 1, wherein a surface of the polymer coating includes nano-, micro-, or milli-meter scale features that increase adhesion to the 3D object.

12. The build apparatus of claim 1, wherein the thermally conductive plate is flexible so as to allow for easier dissociation between the 3D object and the thermally conductive plate upon cooling and reduce damage to the polymer coating or the 3D object during removal of the 3D object.

13. The build apparatus of claim 1, wherein the temperature control unit is a heater cartridge.

14. The build apparatus of claim 1, wherein the build platform has a first coefficient of thermal expansion (CTE) and the thermally conductive plate has a second CTE, wherein the first CTE is greater than the second CTE.

15. The build apparatus of claim 1, wherein the thermally conductive plate is non-magnetically secured to and removable from the build platform.

\* \* \* \* \*